United States Patent
Williams

[15] 3,695,692
[45] Oct. 3, 1972

[54] AUTOMOBILE SEAT COVER
[72] Inventor: Robert J. Williams, Birmingham, Mich.
[73] Assignee: Cadillac Products, Inc, Warren, Mich.
[22] Filed: Sept. 28, 1970
[21] Appl. No.: 76,150

[52] U.S. Cl.................................297/229, 264/230
[51] Int. Cl.................................................A47c 31/10
[58] Field of Search......297/219, 229, 223, 220, 227, 297/228; 229/DIG. 12; 150/52; 264/230, 249

[56] References Cited

UNITED STATES PATENTS

| | | |
|---|---|---|
| 2,356,948 | 8/1944 | Reed..........................264/230 |
| 2,396,635 | 3/1946 | Bogoslowsky..............264/230 |
| 2,545,243 | 3/1951 | Rumsey......................264/230 |
| 2,619,156 | 11/1952 | Seaman......................297/229 |
| 2,904,103 | 9/1959 | Nail..........................297/219 X |
| 2,989,785 | 6/1961 | Stahl...........................264/230 |
| 3,071,819 | 1/1963 | Harrison.............229/DIG. 12 |
| 3,175,027 | 3/1965 | Harrison....................264/230 |
| 3,324,220 | 6/1967 | Goy........................264/230 X |
| 3,470,046 | 9/1969 | Verdin....................264/230 X |

Primary Examiner—Francis K. Zugel
Attorney—Harness, Dickey & Pierce

[57] ABSTRACT

A method of preparing and using a temporary plastic seat cover for installation on automobile and vehicular seats during assembly line production, with the plastic seat cover being made, for example, of polyethylene.

10 Claims, 6 Drawing Figures

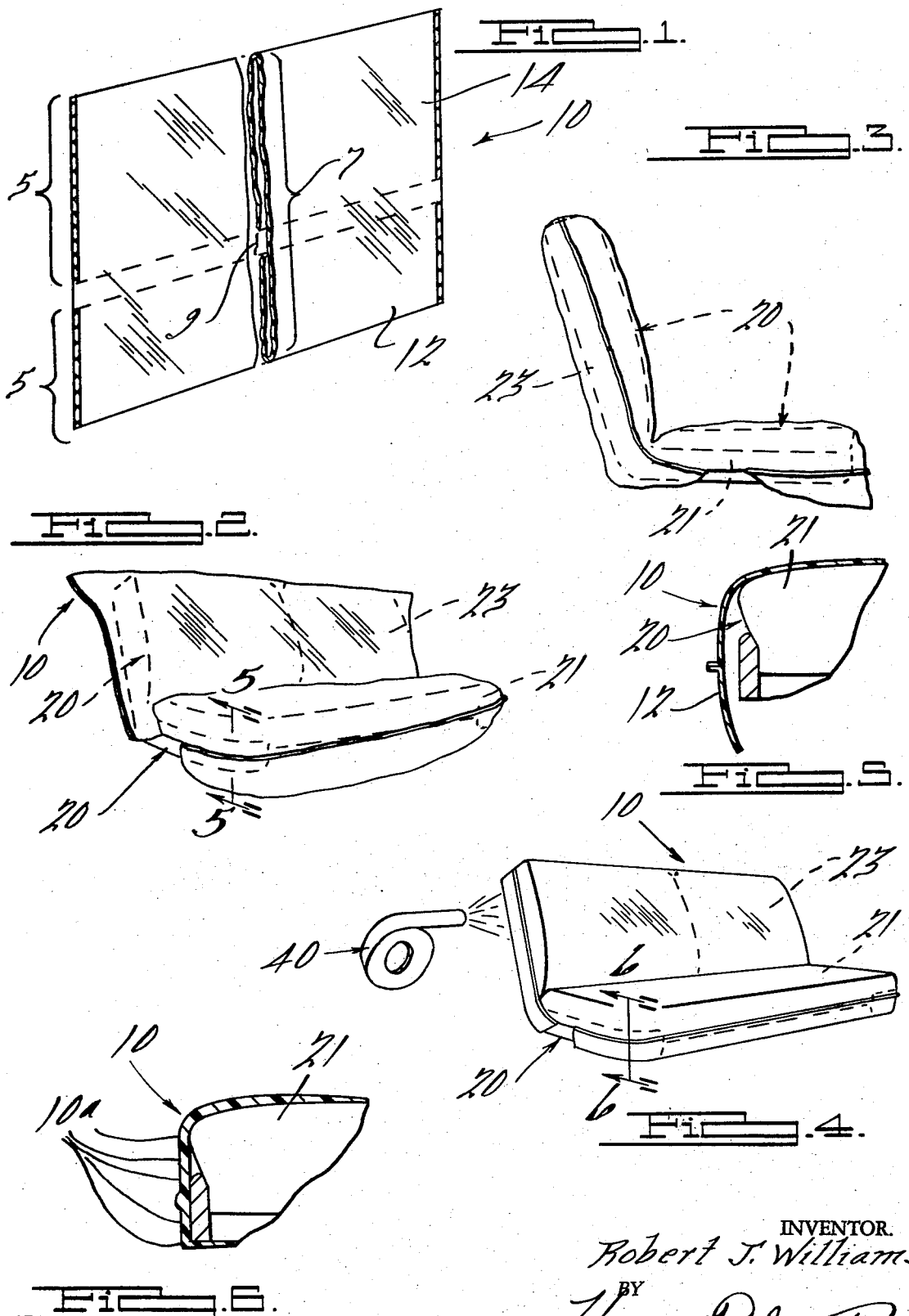

AUTOMOBILE SEAT COVER

BACKGROUND OF THE INVENTION

This invention broadly relates to seat covers. More particularly this invention relates to a method of preparing a new temporary plastic seat cover for use on automobile or other vehicular seats during assembly line production thereof and for short periods of time after said production. The purpose of said temporary protective seat covers is to prevent the seats from becoming soiled, scratched, torn or damaged during assembly line production of the auto or other vehicle that may be involved. Moreover this invention relates to the seat cover product formed by said method, with the seat cover product formed by the method being described as such herein since it is considered impossible to describe the seat cover product in other terms such as the structure, configuration, dimensions and physical characteristics thereof.

PRIOR ART PATENTS

The state of the prior art patents, cited below of record, known to the applicant herein as determined by a preliminary search are as follows: U.S. Pat. Nos. 3,101,037; 3,338,630; 3,371,957; 3,479,085; 3,102,755; 3,233,253; 3,273,178; 3,295,887 and 3,423,775.

BRIEF DESCRIPTION OF THE DRAWINGS

FIG. 1 illustrates a plastic bag means which is used in forming the temporary plastic seat cover of this invention;

FIg. 2 illustrates the plastic bag means of FIG. 1 loosely fitted over a mandrel which is generally shaped the same as an automobile seat, for example, which approximates the final shape of the auto seat onto which the temporary plastic seat cover will eventually be positioned;

FIG. 3 is a side view of FIG. 2;

FIG. 4 illustrates the mandrel of FIG. 2 with the tight-fitting plastic bag means positioned thereover after the plastic bag means has been heat-shrunk tO a tight fit over the mandrel;

FIG. 5 illustrates a cross-sectional view taken along the line 5—5 of FIG. 2; and FIG. 6 illustrates a cross-sectional view taken along the line 6—6 of FIG. 4.

SUMMARY OF THE INVENTION

Briefly stated, the invention comprises a method of preparing a plastic seat cover, for use as a temporary protective seat cover by installation on auto and vehicular seats during assembly line production thereof, and for like uses, said method comprising the steps of: preparing a plastic bag means having at least two enclosure means, one of which is suitable for being loosely fitted over the seatback and the second of which is suitable for being loosely fitted over the seatbottom, said bag means being of a structure and configuration such that said two enclosure means thereof are loose enough to fit over said seatback and seatbottom, but not so loose as to prevent proper heat shrinking of the bag means onto a mandrel, which approximates the final shape of the seat on which the cover is to be used, positioning the plastic bag means on said mandrel, such that said enclosure means of the bag means overlies a shaped portion of the mandrel approximating a seatback, and such that said second enclosure means overlies a shaped portion of the mandrel approximating a seatbottom, directionally heat shrinking said plastic bag means in certain localized areas thereof while still on the mandrel to thereby thicken and thus strengthen high wear and tear areas of said seat cover, removing the heat shrunk plastic bag means from said mandrel such that it is thus prepared for usage as a seat cover on the actual seats.

In another aspect this invention involves a method of using a uniquely prepared polyolefin plastic seat cover as a temporary protective seat cover by installation thereof on auto and vehicular seats during assembly line production thereof.

In still another aspect, the invention comprises a method of preparing a plastic seat cover, for use as a temporary protective seat cover by installation on auto and vehicular seats during assembly line production thereof and for like uses, said method comprising the steps of: preparing a plastic bag means having at least two enclosure means, one of which is suitable for being loosely fitted over the seatback and the second of which is suitable for being loosely fitted over the seatbottom, said bag means being of a structure and configuration such that said two enclosure means thereof are loose enough to fit over said seatback and seatbottom, but not so loose as to prevent proper heat shrinking of the bag means onto a mandrel, which approximates the final shape of the seat on which the cover is to be used, said plastic of the bag having a thickness of approximately 0.2 mils to about 25 mils, positioning the plastic bag means on said mandrel, such that said one enclosure means of the bag means overlies a shaped portion of the mandrel approximating a seatback, and such that second enclosure means overlies a shaped portion of the mandrel approximating a seatbottom, directionally heat shrinking said plastic bag means in certain localized areas thereof by heating the bag means with a heated fluid while still on the mandrel to thereby thicken and thus strengthen high wear and tear areas of said seat cover, said heated fluid being of sufficiently elevated temperature to heat the bag means to a temperature between about 130° F. and about 370° F. so that said shrinking will occur, said shrinking being in the amount of about 5 percent to about 85 percent, removing the heat shrunk plastic bag means from said mandrel such that it is thus prepared for usage as a seat cover on the actual seats, and wherein said plastic is of a material selected from the group consisting of polyethylene, rubber hydrochloride, polystyrene, vinyl, polyvinyl chloride, polyvinylidene chloride, polyester, polypropylene, and mixtures thereof.

DESCRIPTION OF PREFERRED EMBODIMENTS

With reference to the drawings FIG. 1 illustrates a plastic bag means designated 10 which is comprised of what may be termed a lower bag enclosure means 12 and an upper bag enclosure means 14 with these two bag enclosure means 12 and 14 being adapted to be loosely fitted over a mandrel generally designated 20 in FIGS. 2 and 3.

The plastic bag 10 of FIG. 1 is prepared by, first, extruding a blown plastic material, such as polyethylene or other plastic, into a generally cyclindrically shaped bubble or tube; second, the cylindrical tube is then nipped or cut off to form a flattened out tube; third, a section of one side of the flat tube is then knifed or cut out (with this cutout section being generally designated 9 in FIG. 1) to form a flattened C-shaped cross section tube; fourth, the cut out portion is then rewound separately to conserve it for possible other uses; fifth, the flattened out tube, which approximates a flat C-shaped section (designated 7 in FIG. 1) is then rewound on to another shaft, not shown; sixth, the flattened out C-Shaped portion is the heat sealed (see heat-sealed areas designated 5 in FIG. 1) to the appropriate lengths; and seventh, the lengths of the plastic bag can be maintained in roll form by the use of consecutive seals and serrations which allow for the plastic bags to be torn off, or, alternatively if the bags are not to be maintained in roll form then the sealing at areas 5 can be carried out and each bag cut off to form the separate plastic bags 10 as shown in FIG. 1.

FIG. 2 and FIG. 3 which is a side view of FIG. 2 illustrate how the plastic bag 10 which forms the final seat cover is loosely fitted over the mandrel 20. The mandrel 20 approximates the final shape of a seat on which the seat cover formed from the plastic bag 10 is to be used.

Mandrel 20 is comprised of a seatbottom portion 21 and a seatback portion 23 both of which approximate the final shape of a seat-bottom and a seatback on which the cover is to be used.

FIG. 5 illustrates a cross section view taken along the line 5-5 of FIG. 2 to show a cross section of the plastic bag 10 prior to heat shrinking thereof which is subsequently carried out after the bag 10 is loosely fitted over the mandrel.

FIG. 4 illustrates the same plastic bag 10 on the mandrel 20 after there has been applied to the plastic bag sufficient heat to cause heat shrinking of the bag 10 such that it will be tightly fitted on to the mandrel 20. The necessary heat required to raise the temperature of the plastic material of the bag such that it will shrink to a tight fit on the mandrel is supplied by any number of means, such as for example a hot air gun generally designated 40, or by the directional impingement of any number f other of fluids on to the plastic bag to raise the temperature of the plastic material of the bag such that it will shrink to a predetermined desired size.

The cross sectional view illustrated in FIg. 6, which is taken along the line 6—6 of FIG. 4 illustrates how the plastic bag 10 has become thickened due to the heat shrinkage which occurs in the areas designated 10a. The heat shrinking of the plastic bag through use of the heated fluid, such as by the hot air gun 40, is carried out such that the shrinking of the plastic bag 10 takes place generally only in certain localized areas of the plastic bag while it is still on the mandrel to thereby thicken and thus strengthen high wear and tear areas of the seat cover which is to be formed from the plastic bag 10. For example, heat shrinking of the bag is effected primarily at the corners of the seatbacks and particularly the top corners of the seatbacks; and, also at the corners of the seatbottoms and particularly the lower front corners of the seatbottoms to thereby thicken and thus strengthen these high wear and tear areas. Heat shrinkage is also effected along the side edges of the seatbacks and seatbottoms where the plastic bag comes generally in contact therewith. Generally the central areas of the plastic bag 10 or seat cover is not subjected to heat shrinkage and therefore this provides for the ability of the plastic bag to be stretched and removed from the mandrel and subsequently restretched into a mounted position on the actual car seat.

Generally from the above it should be seen that the inventive discovery or concept herein involves shrinking the plastic bag 10 on the mandrel 20, then removing the plastic bag after it has been heat shrunk to the proper shape from the mandrel, after which the plastic bag or seat cover 10 is appropriately shaped and ready for mounting on the seat of an automobile for example on an automobile assembly line for use as a protective seat cover.

It is also contemplated in the invention that an expanding mandrel may be used, that is, a mandrel which contracts after the plastic bag 10 has been shrunk to facilitate removal thereof from the mandrel. If this embodiment is used then the initial plastic bag may be made smaller than the plastic bag described in the embodiments above.

The thickness of the plastic material from which the bag means herein is made may satisfactorily range from about 0.2 to about 25 mils on a broad basis. On a preferred basis the thickness may range from about 0.5 to about 15 mils.

The temperature to which the plastic material forming the bag is heated in order to cause the heat shrinking thereof should broadly be within the range of about 130° F. to about 370° F. Generally unless this temperature range is observed proper heat shrinking of the plastic, in order to shape the desired final seat cover, will not be satisfactorily achievable. Preferably this temperature should be within the range of about 160° F. up to about 370° F.

The plastic material from which the bag or seat cover 10 is made preferably, and for the obtaining of best results, should be polyethylene plastic. The polyethylene which is used may satisfactorily be regular polyethylene adapted for heat shrinking, modified polyethylene, or cross-linked polyethylene. It has also been discovered that polyolefin plastic materials are suitable in carrying out the practice of this invention. Still further and more specifically it has been discovered that the plastic material from which the seat cover or bag 10 is made can satisfactorily be any of the plastics selected form the group consisting of polyethylene, rubber hydrochloride, polystyrene, vinyl, polyvinyl chloride, polyvinylidene chloride, polyester, polypropylene, and mixtures thereof.

The percent of shrinkage which occurs in the plastic bag when it is heated to bring about the shrinkage in accordance with this invention should generally be within the range of about 5 percent to about 85 percent. By this it is meant that those portions of plastic bag which are shrunk due to the heat which is applied thereto, are shrunk in an amount of 5 percent up to as high as about 85 percent by which percentage it is meant changed in size from the original. However, it is to be understood that the entire seat cover or plastic bag 10 need not be shrunk to this extent since generally only certain portions of the plastic bag as detailed hereinabove are subjected to the shrinking action due to the heat being applied normally in certain localized areas only.

In accordance with the inventive discoveries disclosed herein, it is to be understood that the seat cover which is formed in the invention is of a tight fitting relationship such that it fits the contour of the actual seat on which it is to be used and does not slide relative thereto or become detached therefrom in actual usage. Furthermore, the seat cover herein is contemplated for usage of a protective nature during transportation of automobiles to the dealers after factory assembly as well as during assembly line production.

Another unique feature of this invention involves the discovery that the seat cover 10 herein can be prepared such that it will shrink in a fashion which may be termed a primarily unbalanced shrink direction. By this it is meant that one might normally expect that when heat is applied to the heat shrinkable plastic bag, that the bag would shrink more or less equally in all directions, however, it has been discovered that the plastic bag can be made to shrink much more significantly in a widthwise (machine direction) direction across the seat, as opposed to a lengthwise (transverse direction) direction which would be up and down the seat. By the term machine direction as just used it is meant that shrinkage of the plastic material will occur to a much greater extent along the line of direction which follows the direction or length of the extruded plastic cylinder from which the plastic bag means herein is prepared as explained above. By the term transverse direction it is meant that heat shrinkage which occurs across or transverse to the direction of the extruded cylinder of plastic material. When one views the seat cover 10 in FIG. 1, it is seen that transverse direction heat shrinkage would be shrinkage in a lengthwise direction of the seat cover as is generally designated by the numeral 7, whereas, machine direction shrinkage would be shrinkage across the seat cover 10. It has been discovered in this invention that due to the fact that the plastic material from which the seat cover 10 is made is extruded in a cylindrical shape (which is then cut off and sealed in sections to form one or more seat covers 10) that the plastic material from which the seat cover is extruded exhibits heat shrinkage when heat is applied thereto in a primarily unbalanced shrink direction. Namely shrinkage, when heat is applied, takes place to a much greater degree across the seat cover rather than up and down the seat cover. The advantage of this is very significant in that if the shrinkage were in a direction up and down the seat cover when it's positioned on the mandrel or seat form, then there would be a tendency for the plastic material to be stretched taut between the seatback 23 and seatbottom 21 in an up and down direction which in fact would tend to form a slide shaped seat rather than a seat where the seat cover was kept closely contoured and particularly closely contoured to the seat at the area where the crosswise crevice is formed between the seatback 23 and seatbottom 21. Since the shrinkage of the plastic material used to form the seat cover 10 in this invention is primarily in an unbalanced shrink direction across the seat cover it means that the plastic material when heat is applied thereto will shrink up primarily in a crosswise direction on the seat to form a close fitting contour seat cover as shown in FIG. 4.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A plastic seat cover, for use as a temporary protective seat cover by installation on auto and vehicular seats during assembly line production thereof and for like uses, said seat cover being comprised of: plastic bag means having at least two bag-like enclosure means, said plastic bag means having an open area at the back thereof to permit rapid application of said bag-like enclosure means over a seatback and seatbottom, said bag means being of a structure and configuration such that said two enclosure means thereof are loose enough to fit over a seatback form and seatbottom form, but not so loose as to prevent heat shrinking of the bag means into its approximate final shape as a seat cover, said plastic bag means being formed into said seat cover by heat shrinking to a contoured tight fitting relationship such that it will fit the contour of actual seats and will generally not slide relative thereto or become detached therefrom in actual usage, said plastic possessing a characteristic of being heat shrinkable in a primarily unbalanced direction such that when said heat shrinking takes place the elastic shrinks in a direction which is primarily widthwise across the seat cover rather than lengthwise up and down the seat cover.

2. A plastic seat cover, for use as a temporary protective seat cover by installation on auto and vehicular seats during assembly line production thereof and for like uses, said seat cover being comprised of:

plastic bag means having at least two bag-like enclosure means, said plastic bag means having an open area at the back thereof to permit rapid application of said bag-like enclosure means over a seatback and seatbottom, said bag means being of a structure and configuration such that said two enclosure means thereof are loose enough to fit over a seatback form and seatbottom form, but not so loose as to prevent heat shrinking of the bag means into its approximate final shape as a seat cover, said plastic bag means being formed into said seat cover by heat shrinking to a contoured tight fitting relationship such that it will fit the contour of actual seats and will generally not slide relative thereto or become detached therefrom in actual usage, said plastic possessing a characteristic of being heat shrinkable such that when said heat shrinking takes place the plastic shrinks to enclose the seatback and seatbottom.

3. The plastic seat cover of claim 1 wherein the plastic is made of polyethylene.

4. The plastic seat cover of claim 2 wherein the plastic is polyethylene.

5. The plastic seat cover of claim 2 wherein the plastic of the bag means has a thickness of approximately 0.2 mils up to about 25 mils.

6. The plastic seat cover of claim 2 wherein said heat shrinking is made to occur by heating the bag means to a temperature between about 130° F. and about 370° F. to cause said shrinking.

7. The plastic seat cover of claim 2 wherein said shrinking is in an amount between about 5 percent and about 85 percent.

8. The plastic seat cover of claim 2 wherein said plastic is of a material selected from the group consisting of polyethylene, rubber hydrochloride, polystyrene, vinyl, polyvinyl chloride, polyvinylidene chloride, polyester, polypropylene, and mixtures thereof.

9. The plastic seat cover of claim 2 wherein said plastic seat cover is formed by extruding a plastic material in a generally cylindrical shape, and cutting and sealing said extruded plastic material to form said plastic bag means.

10. The plastic seat cover of claim 9 further characterized in that, the plastic bag means when subjected to heat shrinking is heat shrunk in certain localized areas thereof to thereby thicken and thus strengthen high wear and tear areas of said seat cover.

* * * * *

UNITED STATES PATENT OFFICE
CERTIFICATE OF CORRECTION

Patent No. 3,695,692      Dated October 3, 1972

Inventor(s) Robert J. Williams

It is certified that error appears in the above-identified patent and that said Letters Patent are hereby corrected as shown below:

Column 3, line 47, "f" should be -- of --.

Column 3, line 47, "of" should be -- heated --.

Column 6, line 34, "elastic" should be -- plastic --.

Signed and sealed this 20th day of February 1973.

(SEAL)
Attest:

EDWARD M.FLETCHER,JR.
Attesting Officer

ROBERT GOTTSCHALK
Commissioner of Patents